Patented Oct. 1, 1929

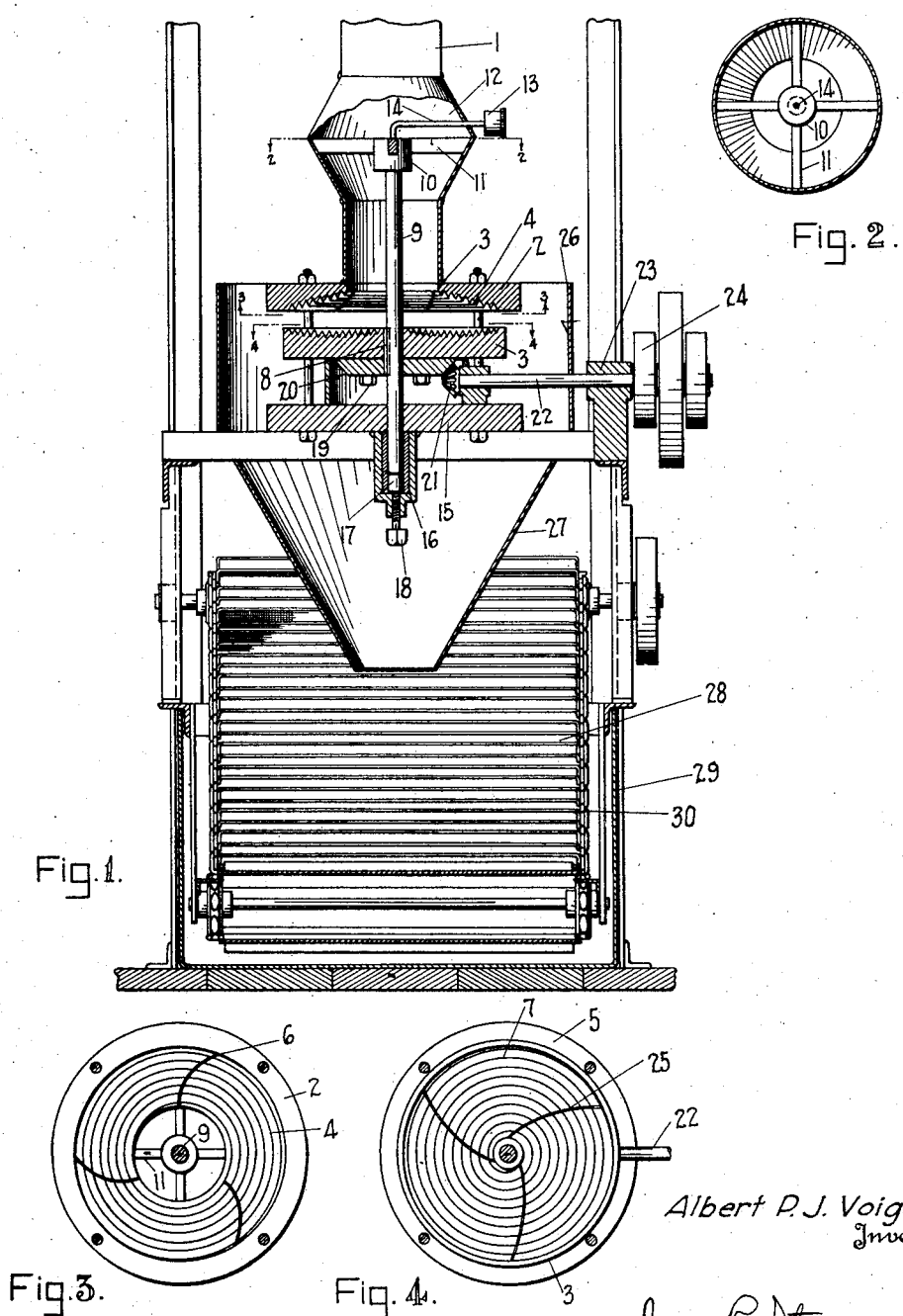

1,729,905

UNITED STATES PATENT OFFICE

ALBERT P. J. VOIGT, OF GALVESTON, TEXAS

NUTCRACKER

Application filed July 25, 1927. Serial No. 208,128.

My invention relates to nut crackers of the mechanically operated type, the object being to crack and remove the shell from the kernel, or meat, of nuts of various sizes. It is particularly adapted for use in cracking and removing the shells from nuts of palm trees of the cohune variety. These nuts are of general oval or egg shaped form and are of various sizes.

It is an object of my invention, therefore, to provide a cracker which will operate effectively upon all ordinary sizes of nuts so as to crack them without mutilating the kernel and to remove the shuck from the kernel in a most effective manner.

It is an object to first crack the shell upon the nut and then to remove the kernel from the shell by a centrifugally operated apparatus which serves to jar the kernel from the shell.

Referring to the drawings herewith, Fig. 1 is a vertical section through a cracking apparatus constructed in accordance with my invention. Fig. 2 is a transverse section taken on the plane 2—2 of Fig. 1. Figs. 3 and 4 are similar sections taken on the planes 3—3 and 4—4 respectively of Fig. 1 and taken in the direction of the arrows, as indicated.

It is to be understood that the nuts to be cracked are fed to the machine through a chute 1 which may lead from a husking apparatus or from a hopper or any container discharging the nuts through the said chute to the cracking apparatus. The chute 1 is adapted to feed the nuts by gravity to a cracker comprising an upper plate 2 and a lower plate 3. The upper plate is preferably a solid plate of metal having a central opening 3' therein, to which is connected the lower end of the chute 1. The lower face of the said plate is provided with a spiral groove 4, the corrugations forming teeth adapted to engage the shell of the nut and crack it. The toothed face extends from the central opening in a downwardly inclined direction toward the outer edge, the corrugations terminating short of the outer edge, leaving a smooth uncorrugated surface 5 about the outer edge of the plate. Beside the spiral groove making up the teeth upon the plate I provide a plurality of vanes 6, which cross the corrugations but are themselves curved rearwardly relative to the direction of rotation of the plate, so that the tendency both of the corrugations and of the vanes will be to throw the nuts toward the outer edge of the plate.

The lower plate 3 is also provided with a spiral corrugation 7 on its upper face. Said plate is of slightly smaller diameter than the upper plate 2, the grooved or toothed surface 7 being of approximately the same diameter as the corrugated or toothed face of the upper plate 2. Said plate 3 has a central opening 8 therethrough to receive a shaft 9, to which the plate is secured and with which it is rotatable.

The said shaft, indicated at 9, extends vertically upward through the lower plate and through the lower portion of the chute 1 and is secured at its upper end within a bearing 10 centrally of the chute 1, said bearing being connected by radiating braces or spokes 11 to the walls of the enlarged chamber 12 within the chute 1. A grease cup 13 without the housing is connected by means of a tube 14 to the upper bearing of the shaft 9 so that the same may be lubricated. The lower end of the shaft 9 is extended through a base plate 15 and seats within a bearing 16 secured to said plate. Said bearing is an adjustable one, there being a block 17 in the lower end of the bearing housing, said block being adjustable vertically through an adjusting screw 18. Said screw 18 will serve to take up for wear in the bearing during operation.

On the lower side of the plate 3 and secured thereto by bolts 19 is a gear 20. Said gear is rotatable with the lower plate 3 of the cracker and serves to communicate a rotative movement to said plate from a gear 21, meshing therewith and secured upon the end of a shaft 22 journaled at its outer end within a bearing 23 and adapted to be rotated at various speeds through pulleys 24 on said shaft.

The cracker plate 3 is provided with spirally arranged vanes 25 similar in construction to the vanes 6 upon the upper plate. These vanes 25 extend rearwardly from the direction of rotation of the plate 3 so as to direct the nuts toward the outer side of the plate. It is to be noted that the opposite faces of the plates 2 and 3, where the toothed area occurs, converge outwardly so that the nuts being fed to the cracker through the chute will pass into zones where the opposite faces are increasingly close together, so that each nut will engage at a certain point between the two opposite plates where the shell of the nut will be caught and the shell cracked.

Outside the cracker plates and spaced at a suitable distance therefrom is a baffle plate 26. Said baffle provides a side wall of a container into which the cracked nuts are discharged. Below this cylindrical wall 26 is the downwardly directed discharge chute 27, from which the cracked nuts are discharged on to a separator, indicated at 28.

The construction of the separator is no part of the present invention. The one shown herein is set out and claimed in a separate application co-pending with this application and filed of even date therewith and bearing Serial No. 208,129. It includes a tank 29 in which liquid may be placed and the flotation system is relied upon for separating the kernels from the shucks. A conveyer, shown at 30, assists in carrying the shucks from the tank. It is understood that this separator is representative of any type of separator which may be desired to use, and further description will be unnecessary.

In the operation of my device, the nuts will be fed through the chute 1 upon the lower of the plates 3, which will be rotated at a rapid rate of speed, so that the nuts will be moved radially outward from the center and into the converging space between the upper and lower cracking plates. Each nut will eventually engage between the plates and be carried by centrifugal force outward so that the shell will be crushed and the further centrifugal action will discharge the cracked nut laterally with some force against the baffle formed by the side wall 26. The shock of the cracked nut striking the wall will be sufficient to separate the kernel from the shell and the shell and kernel will be discharged by gravity through the chute 27 into the separator. The vanes upon the two plates assist in working the nuts outwardly under the force of rotation of the lower plate. It will be noted that there will be a screw action between the two plates due to the spiral shape of the teeth and of the vanes which will work the nuts into the constricted space between the plates so that they will be crushed to crack the shells without injuring the kernel within. The continued rotation of the cracking plate will serve also to discharge the cracked nuts with such force as to separate the kernel from the shell. This is a simple and positive arrangement which makes it possible to crack nuts of different sizes at a rapid rate of speed and without danger of choking the space between the plates, as now sometimes occurs, with other types of crackers. The advantages of this construction will be apparent without further description.

What I claim as new is:

1. A nut cracker comprising an upper plate, and a lower plate, spiral grooves on adjacent faces, said faces converging toward their outer edges, means to feed nuts to the space between said plates and means to rotate one of said plates.

2. A nut cracker comprising an upper plate, and a lower plate, said plates having spiral grooves therein on their opposing faces, said faces converging toward their outer edges to crack the nuts, means to feed nuts to the space between said plates and means to rotate one of said plates to move the nuts toward the outer edges of said plates, and a baffle adjacent said plates against which said nuts are thrown after being cracked.

3. A nut cracker comprising an upper plate, and a lower plate, said plates having spiral grooves therein on their opposing faces, said faces converging toward their outer edges, the upper of said plates having a central opening connecting with a chute to feed nuts to the space between said plates and means on said plates to crack the nuts as they travel in said grooves.

4. A nut cracker comprising upper and lower plates spaced apart to receive nuts between them, spiral grooves on said plates, means to rotate the lower plate, to move said nuts outwardly, said grooved surfaces converging toward the outer edge, and additional means on said plates to move said nuts outwardly as said lower plate is rotated.

5. A nut cracker comprising upper and lower plates spaced apart to receive nuts between them, spiral grooves on said plates, means to rotate the lower plate, to move said nuts outwardly, said grooved surfaces converging toward the outer edge, spirally arranged vanes on said plates to move said nuts outwardly as said lower plate is rotated.

6. A nut cracker comprising upper and lower plates spaced apart to receive nuts between them, spiral grooves on said plates, means to rotate the lower plate, to move said nuts outwardly, said grooved surfaces converging toward the outer edge, means on said plates to move said nuts outwardly as said lower plate is rotated, and means against which said nuts are adapted to contact to remove the kernels therefrom by concussion.

7. A nut cracker comprising upper and lower toothed plates, means to feed nuts into the space between said plates, the space between said plates being a converging one, grooves to move the nuts into said converging space for cracking, and means on said plates to crack the nuts in said grooves.

8. A nut cracker comprising upper and lower toothed plates, means to feed nuts into the space between said plates, the space between said plates being a converging one, means to move the nuts into said converging space for cracking, and means to rotate one of said plates, and a baffle against which said nuts are adapted to be discharged to separate the shells from the kernels.

9. A nut cracker including a pair of plates adapted to receive nuts therebetween, spiral grooves formed on the outwardly converging adjacent faces of said plates whereby the nuts travel into a position to be cracked, and means on said faces to crack the nuts.

10. A nut cracker adapted to crack nuts of various sizes including a pair of plates, concaved faces on said plates whereby an outwardly tapering cavity is formed and means on said faces to conduct the nuts outwardly to be cracked.

In testimony whereof I hereunto affix my signature this 15th day of July, A. D. 1927.

ALBERT P. J. VOIGT.